United States Patent [19]

Thomson

[11] Patent Number: 4,490,323
[45] Date of Patent: Dec. 25, 1984

[54] INCORPORATION OF LIQUID ADDITIVES INTO POLYMERIC FILMS

[75] Inventor: Bruce J. Thomson, Epping, Australia

[73] Assignee: Union Carbide Australia, Limited, Sydney, Australia

[21] Appl. No.: 472,134

[22] Filed: Mar. 4, 1983

[51] Int. Cl.³ .............................................. D01F 1/02
[52] U.S. Cl. .................................. 264/211; 523/351; 524/585
[58] Field of Search ...................... 264/210.6, 211, 349; 524/318, 585; 523/351

[56] References Cited

U.S. PATENT DOCUMENTS

| | | | |
|---|---|---|---|
| 2,698,463 | 1/1955 | Conwell et al. | 264/210.6 |
| 2,956,306 | 10/1960 | Conwell et al. | 264/210.6 |
| 3,030,330 | 4/1962 | Cines et al. | 260/41 |
| 3,496,133 | 2/1970 | Hoffman | 260/40 |
| 3,658,980 | 4/1972 | Caiola et al. | 264/210 |
| 3,988,285 | 10/1976 | De Vrieze | 524/585 |
| 4,065,532 | 12/1977 | Wild et al. | 264/211 |
| 4,144,214 | 3/1979 | Corbacella | 260/23 |
| 4,189,420 | 2/1980 | Sugimoto et al. | 260/31.6 |

*Primary Examiner*—Theodore Morris
*Assistant Examiner*—Willie Thompson
*Attorney, Agent, or Firm*—James L. Sonntag

[57] ABSTRACT

Masterbatch concentrates are prepared by the use of a granular resin, permitting higher concentration of liquid additives in the concentrate.

10 Claims, No Drawings

INCORPORATION OF LIQUID ADDITIVES INTO POLYMERIC FILMS

BACKGROUND OF THE INVENTION

This invention relates to the incorporation of liquid additives in the production of thermoplastic films, such as polyethylene film.

In the production of thermoplastic films by a melt extrusion process, polymeric resin, generally in the form of pellets, is advanced, typically by a screw mechanism, into a heating zone where the polymeric resin is melted and thereafter extruded through a die to form a film. Often liquid additives are incorporated in the polymeric resin to be extruded to impart various desired properties to the film. Such additives include but are not limited to cling agents, anti-static agents, anti-fogging agents, deodorants, fragrances, anti-oxidants, and the like. One way of incorporating the liquid additive into the polymeric resin is to introduce the liquid additive directly to the resin pellets before they are fed into the melt zone. With higher liquid amounts, this method often causes excessive slippage of the pellets at the screw, which deleteriously affects the feeding of the pellets to the extruder and renders difficult the process of extruding an acceptable film containing the additive. This is largely due to an uneven distribution of the liquid additive over the surface of the pellets causing excessive differences in the frictional relationships between the individual pellets, between the pellets and the extruder screw, and between the pellets and the extruder barrel. This leads to the inability to achieve the proper transfer and melt rates during the extrusion process. The result is surging of the feed and unacceptable variations in the thickness of the film, or even the shutdown of the extrusion process altogether. Thus, by simply introducing the liquid additive directly to the resin pellets of the feed, it has been generally difficult or even impossible to attain the liquid additive concentrations which are often necessary to impart the desired properties to the film.

In order to overcome the difficulties caused by introducing the liquid additive directly to the feed, it has been the practice to incorporate the liquid additive into the polymeric resin while it is in a molten form, and then to form the resin into pellets. The formation of this so called "hot-compounded" resin requires a hot compounding step which is energy intensive, requires extra process steps, and is costly.

Another prior art method for avoiding the screw slippage problem, during the incorporation of a liquid additive into a film, is to feed the liquid additive under pressure directly into the extruder barrel beyond the zone where the pellets are melted. A disadvantage of this method is that inadequate mixing occurs due to the physically incompatible materials meeting too close to the extrusion zone of the melted resin. This results in a melted extrudate which is not adequately mixed with the liquid additive. The variations in film quality that result are generally unacceptable.

Still another prior art method of incorporating a liquid additive in the polymeric resin to be extruded is to form a concentrated masterbatch of the liquid additive mixed with a pelleted polymeric resin that is compatible with the resin used to form the film. This "masterbatch concentrate" is then introduced to the resin pellets being fed into the extruder. A difficulty with this method is that the maximum amount of liquid additive that can be added to the pelletized resin of the masterbatch is often too small to provide a masterbatch concentrate having sufficient liquid additive to perform its function in the film. The low concentration of liquid additive in the masterbatch concentrate then requires an excessive quantity of masterbatch concentrate, resulting in a greater expense to handle the large amount of material of the masterbatch.

In view of the prior art problems, an object of this invention is to provide a method for introducing a liquid additive into an extruded film by the masterbatch method wherein the concentration of liquid additives in the masterbatch is at a high level not previously possible.

Other objects will become apparent from the ensuing disclosure and appended claims.

SUMMARY OF THE INVENTION

One aspect of the invention relates to an improvement in a process for the incorporation of liquid additives in the manufacture of thermoplastic films wherein a polymeric solid film resin is advanced to a melt zone to form a melted resin which is extruded through a die to form a film. The improvement of this invention comprises blending a liquid additive with a granular masterbatch resin which is compatible with the film resin to form a masterbatch concentrate. The granular masterbatch resin has a particle size less than about 1.5 millimeters, preferably a particle size between about 0.2 and 1.5 millimeters. The masterbatch concentrate and the solid film resin are mixed before advancement to the melt zone.

Another aspect of the invention involves masterbatch concentrate comprising a granular polymeric resin having a particle size less than about 1.5 millimeters, preferably between about 0.2 millimeters and 1.5 millimeters, and a liquid additive in a concentration greater than about 5 wt. %, preferably between about 10 wt. % and 30 wt. %, based on the combined weight of the liquid additive and the granular resin.

DESCRIPTION OF THE INVENTION

It has been found that by the practice of the invention, a liquid additive may be incorporated into a granular resin to form a masterbatch concentrate having a concentration of liquid additive substantially higher than readily achievable through the prior art method using pelletized resins. By practice of the invention, therefore, it is possible to use a significantly smaller quantity of masterbatch concentrate to attain the same concentration of additive in the final film. The masterbatch concentrate of this invention remains a relatively free flowing granular material even with relatively high concentrations of liquid additive. For example, for glycerol mono-oleate, a liquid cling additive, the concentration in the masterbatch concentrate achievable with the prior art was less than about 2 weight percent additive, based on the combined weight of the masterbatch resin and the liquid, where the resin was low-density polyethylene in the pelletized form (a particle size of about 3mm). By practice of the invention, where the particle size is less than about 1.5 millimeter, much higher concentrations of additive are possible, about 10 to 15 weight percent glycerol mono-oleate, based on the combined weight of the masterbatch polyethylene resin and the liquid. The use of a masterbatch concentrate having a higher concentration lessens the material handling problems and allows for a lower feed rate of the masterbatch concentrate to the film resin to be extruded. The concentration of liquid additive in the masterbatch concentrate that is achievable in practice of the invention will depend on the resin used to form the masterbatch concentrate and the liquid additive used. However, by practice of the invention, concentrations will be achievable that are significantly greater than that achievable in the prior art, which are generally about 5 wt. % Typically, the maximum attainable concentration is about 30 wt. %, although this may vary for different liquid additives. The concentration actually used will depend on the desired concentration of the liquid additive in the final film and the relative amounts of the masterbatch resin and the film resin used. In a preferred embodiment, the concentration of the liquid additive in the masterbatch will be between about 10 and about 30 wt. %, based on the total weight of the resin and the additive. The upper limit of the preferred range is based on saturation of the masterbatch resin, although this limit will depend on the particular resin and liquid additive. A liquid additive concentration of at least 10 wt. % is preferred to achieve the full advantages over the prior art, as previously described.

The masterbatch resin used in the invention may be any resin which is compatible with the film resin. By "compatible" is meant a polymer that is dispersible with the film resin to form a uniform extrudate. The film resins suitable for use in the invention include high- or low-density polyethylene polymers, copolymers or terpolymers, ethylene-vinyl acetate copolymer, polypropylene, ethylene ethylacrylate, ethylene methylacrylate, ethylene butylacrylate, and vinyl acetate. The masterbatch resin useful in the invention includes any of the resins listed above for the film resin. Preferably the film resin is polyethylene and the masterbatch resin is polyethylene having similar properties to those of the film resin.

The masterbatch resin is in what is commonly called a "granular" form, that is, having a particle size less than about 1.5 millimeters, preferably between about 1.5 and about 0.2 millimeters. This is in contrast to the typical "pelletized" form (extruded cylindrical pellets about 3 mm in diameter and 3 mm long) in which many resins are commercially available. Preferably the particle size is not too small so as to cause caking and other similar problems that would negatively affect the mixing of the masterbatch resin with the liquid additive. A particularly suitable particle size is that found in the commercially available granular resins, which typically have a particle size less than about 1.5 millimeters and greater than about 0.2 millimeters.

The granular resin used in the invention is typically produced directly from a process for making the resin. In many processes for the manufacture of polymeric resins, such as for polyethylene, the final solid polyethylene product discharged from the reactor system and before further processing is in a granular form. These processes are well known in the art. Examples include any of the well known low-pressure, gas-phase processes for producing low- or high-density polyethylene, such as the well-known "UNIPOL" processes for producing low-density polyethylene, which are used and licensed by Union Carbide Corporation, Danbury, Connecticut. The UNIPOL processes are generally described in Process Engineering News, February, 1980, "Processing The Linear LDPE's: There Are Some Differences". The granular polyethylene product produced by these well known processes typically is in a granular form. The particles are typically of a very convoluted shape and have a size between about 0.2 and 1.5 millimeters. The density of the polyethylene is generally between about 0.915 and 0.965 grams per cubic centimeter. The granular low-density polyethylenes produced by the UNIPOL processes typically have particles in this size range, and the density of the polyethylene is generally between about 0.915 and 0.940 grams per cubic centimeter. Typically about 40 wt. % of this UNIPOL polyethylene has a particle size of about 0.4 millimeters. Since the above described polyethylenes are readily available in the desired granular form for practice of the invention without the need for additional process steps, they are the most preferred resin for use as the masterbatch resin.

Typically the film resin, the resin to be extruded as the film, is in a pelletized form, but may also be in a granulated form as is the masterbatch resin. This may in some circumstances provide further process advantages such as improved mixing of the solid film resin and the solid masterbatch resin in the extruder, and the melting of the masterbatch and film resins in a common zone in the extruder barrel, which may provide for a further improvement in the mixing of the resins.

The liquid additive may, for example, be any of the well known liquid additives introduced to melt-extruded polymeric films to modify their properties. These include cling agents, anti-static agents, anti-fogging agents, antioxidants, stabilizers, fragrances and coloring agents. Examples of cling agents include glycerol mono-oleate, glycerol dioleate, mineral oils, and vegatable oils, such as soybean oil, and corn oil. Examples of anti-fogging agents include glycerol mono-oleate, glycerol monolaurate, glycerides, and polyethylene glycol monostearate. An example of an anti-static agent is glycerol monostearate. Suitable fragrances include floral and citrus fragrances. Suitable coloring agents include compatible combinations of a dye in a carrier such as mineral oil or vegetable oil. Additives that are otherwise solid can be dissolved in a solvent and the liquid solution containing the additive used in the process of the invention as the liquid additive. Other components may be introduced to modify or enhance the performance of the liquid additive in either the masterbatch or in the admixture with the film resin. These include other components such as diluents to decrease the viscosity of the liquid additive, or wetting agents to improve the mixing of the liquid additive with the granular resin.

The film resin or the masterbatch resin may also include, already incorporated therein, any of the well known solid or liquid additives used in thermoplastic films, such as solid antiblocking agents or slip agents, or any of the liquid additives listed above.

The masterbatch concentrate is made by mixing the liquid additive in the desired amount with the masterbatch resin. Mixing can be by any suitable method used to disperse liquids in solid materials. The liquid additive and the masterbatch resin may be mixed "off-line" by devices such as tumblers, ribbon blenders, high-speed mixers, or spraying devices. The liquid additive and the masterbatch resin may also be mixed "on-line" as it is fed into the extruder by any of the feeder/blender units known in the art.

The masterbatch concentrate containing the liquid additive and the film resin are mixed by any appropriate method and then the mixture is advanced to the melt zone to be extruded through a die to form the film. The masterbatch concentrate and the film resin can be mixed by any of the blending methods suitable for mixing solid materials, such as the well known off-line methods using tumblers, ribbon blenders, or high-speed mixers. Alternately, the film resin and the masterbatch concentrate can be simultaneously mixed and advanced to the melt zone by a screw extruder with a mixing screw. Another method is to feed the masterbatch concentrate directly into the screw extruder where it is mixed with the film resin.

The extrusion method may be any of the well known methods for making a film, such as blown film extrusion and slot cast extrusion. The process of the invention may also be used in the making of multilayer films by any of the well known methods, such as co-extrusion, to incorporate an additive into at least one of the layers.

The following examples illustrate the invention and are not intended to be a limitation thereto.

In the following examples the standard test, ASTM D-1238, Condition E, was used to determine the Melt Index for the polyethylene resins.

EXAMPLE I

A masterbatch concentrate was made by tumbling for approximately 20 minutes, in a small concrete mixer, 18 kilograms of a linear low density polyethylene (Grade GRSN 7047, Union Carbide Corporation, Danbury, Conn., U.S.A., density=0.920 grams per cubic centimeter, Melt Index=1.0 grams per 10 min.) in a granular form, with 2 kilograms of glycerol mono-oleate which was added slowly in a free flowing liquid form at about 30° C. The granular polyethylene had a bulk density of about 0.3 grams per cubic centimeter, a particle size between about 0.3 millimeters and about 1.2 millimeters.

A portion of the masterbatch concentrate (2.25 kg) was then tumble blended in a similar apparatus as above with 12.75 kilograms of a linear low density polyethylene resin of a similar grade as that used in the masterbatch concentrate but in a pelletized form (Melt Index=1.0, Density=0.920, Grade XU 900, Union Carbide Australia Limited, Sydney, Australia). The particle size of the pellets was about 3 mm in diameter and 3 mm long. Several 15 kg batches of polyethylene containing 1.5 wt. % glycerol mono-oleate were prepared in this manner as a feedstock for film extrusion.

The blended feedstock was extruded on a 63.5 mm blown film extrusion line (length/diameter—18:1, linear, low density polyethylene screw) equipped with a conventional 200 mm spiral mandrel die (gap 2.0 mm) and venturi air ring. Barrel and die set temperatures were 210° C., resulting in a melt temperature of 250° C. A steady state extrusion rate (0.5 kg/hr per revolution/min.) was achieved that was equivalent to the rate normally attained with the less desirable hot compounded resins. Thus, the problem of screw slippage was largely eliminated without the higher power requirements, extra process steps, and cost inherent in preparing a hot compounded resin. The film was about 11 microns thick and had cling characteristics similar to commercially available films. The other physical properties were essentially the same as a commercial film. Thus, it was possible by practice of the invention to easily incorporate the cling agent in the film to a suitable concentration without adversely affecting the other properties of the film.

EXAMPLE II

Using the above-described procedure in Example I, masterbatch concentrates having concentration of about 15 wt. % glycerol mono-oleate, and films containing about 2.0 wt. % glycerol mono-oleate were made. The properties of the films were similar to films made using conventional hot compounded resins.

The masterbatch concentrates had flow properties only somewhat inferior to a granular resin that is free of liquid additives, even though the concentrates contained a significant concentration of liquid additive. The flow properties of the concentrates were still adequate under typical process conditions in spite of the fact that they contained up to 15 wt. % glycerol mono-oleate which, as a cling agent, would be expected to significantly inhibit flow of the granular masterbatch concentrate. Thus, it is possible by practice of the invention to form masterbatch concentrates having high levels of additives without a significant deterioration of the flow properties.

EXAMPLE III

Masterbatches were made by mixing weighed quantities of a liquid additive with the granular polyethylene resin used in Example I. Two methods of blending were used and are described below:

METHOD A—A predetermined weighed quantity of the liquid additive was added directly to a weighed quantity of granular resin and blended by tumbling. For example, if a 10 wt. % concentration of the liquid in the masterbatch concentrate is desired, 10 parts of the liquid additive are added to 90 parts of the granular resin and blended.

METHOD B—A predetermined weighed quantity of the liquid additive was added to approximately half of the granular resin required for the masterbatch concentrate to form a supersaturated preblend. The preblend was then blended with the other half of the granular resin to form the desired masterbatch concentrate. For example, if a 10% concentration of the liquid in the masterbatch concentrate is desired, 10 parts of liquid additive was added to about one half (45 parts) of the granular resin to form a preblend, which was then added to the other half of the granulated resin (45 parts) and tumble blended to form the final masterbatch concentrate.

For the additive tested, the maximum attainable concentration in the masterbatch concentrate was determined by making masterbatch concentrates of differing concentrations of liquid additive. Starting at about 5 wt. %, the concentration of the liquid additive was increased in increments of about 5 wt. % until maximum saturation was exceeded. Maximum saturation is exceeded when the liquid additive begins to separate from the granular resin. This was objectively determined by placing a sample of the concentrate on an absorbent paper and observing the amount of staining. When the amount of staining became significantly higher than the amount of staining of the next lower concentration, the maximum saturation was exceeded. In Table A are tabulated the concentrations of the additive at the point just before the maximum saturation was exceeded, for both Methods A and B. The additive tested was a vegetable oil used as a cling agent (Partially Hydrogenated Soybean Oil, Crisco Oil, Procter & Gamble Co., Cincinnati, Ohio, U.S.A.).

TABLE A

| ADDITIVE | MAXIMUM WEIGHT PERCENT ADDITIVE IN MASTERBATCH | |
|---|---|---|
| | METHOD A | METHOD B |
| Vegetable Oil | 25 | 30 |

For comparison, masterbatch concentrates were made using a pelleted resin (DFDA-7047, available from Union Carbide, Danbury Conn.) and Additive No. 1. Method A and Method B were used to make the concentrates, except that a pelletized resin was used instead of a granular resin. The pelletized resin was in the form of cylindrical pellets about 3 mm is diameter and about 3 mm long. Maximum saturation was reached at the initial concentration of 5 wt. % for both Method A and Method B. This demonstrates the significant advantage that can be attained by practice of the invention. With this additive, the maximum attainable concentration in the masterbatch concentrate was increased at least five times over that possible with the method of the prior art. As explained above, the maximum attainable concentration will be different for each liquid additive, but a similar increase in magnitude of the concentration for any liquid additive would be expected by practice of this invention.

What is claimed is:

1. In a process for the addition of liquid additives in the manufacture of thermoplastic polymeric film wherein solid film resin is advanced to a melt zone to form a melted resin, which is extruded through a die to form the film, the improvement comprising blending a liquid additive with a free flowing granular masterbatch resin which is compatible with the film resin and which has a particle size between about 0.2 millimeters and about 1.5 millimeters, to form a masterbatch concentrate, and mixing the masterbatch concentrate with the solid film resin before advancement to the melt zone.

2. The process of claim 1 wherein the granular masterbatch resin is polyethylene made from a low-pressure gas-phase process.

3. The process of claim 1 wherein the liquid additive is selected from the group consisting of cling agents, anti-static agents, anti-oxidants, stabilizers, anti-fogging agents, and fragrances.

4. The process of claim 3 wherein the liquid additive is glycerol mono-oleate.

5. The process of claim 1 wherein the concentration of the liquid additive in the masterbatch concentrate is greater than about 5 wt. %, based on the combined weight of the granular resin and the liquid additive.

6. The process of claim 1 wherein the concentration of the liquid additive in the masterbatch concentrate is between about 10 wt. % and 30 wt. %, based on the combined weight of the granular resin and the liquid additive.

7. A master batch concentrate comprising a mixture of free flowing granular resin having a particle size between about 0.2 millimeters and about 1.5 millimeters, and a liquid additive in a concentration greater than about 5 wt. %, based on the combined weight of the granular resin and the liquid additive.

8. The masterbatch concentrate of claim 7 wherein the liquid additive is glycerol mono-oleate.

9. The masterbatch concentrate of claim 7 wherein the granular resin is polyethylene made from a low-pressure, gas-phase process.

10. The masterbatch concentrate of claim 7 wherein the concentration of the liquid additive is between about 10 wt. % and 30 wt. %, based on the combined weight of the granular resin.

* * * * *